United States Patent
Kingsbury et al.

(10) Patent No.: US 7,467,330 B2
(45) Date of Patent: *Dec. 16, 2008

(54) SYSTEM AND METHOD FOR JOURNAL RECOVERY FOR MULTINODE ENVIRONMENTS

(75) Inventors: Brent A. Kingsbury, Beaverton, OR (US); Sam Revitch, Portland, OR (US); Terence M. Rokop, Hillsboro, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/499,907

(22) Filed: Aug. 4, 2006

(65) Prior Publication Data

US 2007/0033436 A1 Feb. 8, 2007

Related U.S. Application Data (63) Continuation of application No. 10/251,626, filed on Sep. 20, 2002, now Pat. No. 7,111,197.

(60) Provisional application No. 60/327,191, filed on Oct. 1, 2001, provisional application No. 60/324,787, filed on Sep. 24, 2001, provisional application No. 60/324,196, filed on Sep. 21, 2001, provisional application No. 60/324,226, filed on Sep. 21, 2001, provisional application No. 60/324,224, filed on Sep. 21, 2001, provisional application No. 60/324,242, filed on Sep. 21, 2001, provisional application No. 60/324,195, filed on Sep. 21, 2001, provisional application No. 60/324,243, filed on Sep. 21, 2001.

(51) Int. Cl.
*G06F 11/00* (2006.01)
(52) U.S. Cl. .................. 714/19; 714/15; 707/202
(58) Field of Classification Search ............ 714/15, 714/19; 707/202
See application file for complete search history.

(56) References Cited

U.S. PATENT DOCUMENTS

| | | | | |
|---|---|---|---|---|
| 5,151,988 A | * | 9/1992 | Yamagishi | 707/8 |
| 5,327,556 A | * | 7/1994 | Mohan et al. | 707/8 |
| 6,108,654 A | * | 8/2000 | Chan et al. | 707/8 |
| 6,163,855 A | * | 12/2000 | Shrivastava et al. | 714/4 |
| 6,272,491 B1 | * | 8/2001 | Chan et al. | 707/8 |
| 6,370,625 B1 | * | 4/2002 | Carmean et al. | 711/152 |
| 6,618,819 B1 | * | 9/2003 | Adamovits et al. | 714/13 |
| 6,725,392 B1 | * | 4/2004 | Frey et al. | 714/6 |
| 7,111,197 B2 | * | 9/2006 | Kingsbury et al. | 714/19 |
| 7,266,722 B2 | * | 9/2007 | Kingsbury | 714/15 |
| 2003/0172236 A1 | * | 9/2003 | Iyengar et al. | 711/145 |

* cited by examiner

Primary Examiner—Joshua A Lohn (57) ABSTRACT

A system and method are disclosed for providing journal recovery in a multi-node environment which comprises determining whether a block was updated by a first node; determining whether the block is associated with a lock held by a second node; and writing the block to a final location if the block is not associated with a lock held by the second node.

16 Claims, 12 Drawing Sheets

SYSTEM AND METHOD FOR JOURNAL RECOVERY FOR MULTINODE ENVIRONMENTS

CROSS REFERENCE TO RELATED APPLICATIONS

This is a Continuation of application Ser. No. 10/251,626, filed Sep. 20, 2002 now U.S. Pat. No. 7,111,197, which is hereby incorporated by reference.

This application claims the benefit of U.S. Provisional Application No. 60/324,196 filed Sep. 21, 2001, U.S. Provisional Application No. 60/324,226 filed Sep. 21, 2001, U.S. Provisional Application No. 60/324,224 filed Sep. 21, 2001, U.S. Provisional Application No. 60/324,242 filed Sep. 21, 2001, U.S. Provisional Application No. 60/324,195 filed Sep. 21, 2001, U.S. Provisional Application No. 60/324,243 filed Sep. 21, 2001, U.S. Provisional Application No. 60/324,787 filed Sep. 24, 2001, and U.S. Provisional Application No. 60/327,191 filed Oct. 1, 2001.

This application is related to co-pending U.S. patent application Ser. No. 10/251,689 entitled A SYSTEM AND METHOD FOR SYNCHRONIZATION FOR ENFORCING MUTUAL EXCLUSION AMONG MULTIPLE NEGOTIATORS filed concurrently herewith, which is incorporated herein by reference for all purposes; and co-pending U.S. patent application Ser. No. 10/251,645 entitled A SYSTEM AND METHOD FOR COLLABORATIVE CACHING IN A MULTINODE SYSTEM filed concurrently herewith, which is incorporated herein by reference for all purposes; and co-pending U.S. patent application Ser. No. 10/251,690 entitled A SYSTEM AND METHOD FOR MANAGEMENT OF A STORAGE AREA NETWORK filed concurrently herewith, which is incorporated herein by reference for all purposes; and co-pending U.S. patent application Ser. No. 10/251,894 entitled SYSTEM AND METHOD FOR IMPLEMENTING JOURNALING IN A MULTI-NODE ENVIRONMENT filed concurrently herewith, which is incorporated herein by reference for all purposes; and co-pending U.S. patent application Ser. No. 10/251,895 entitled A SYSTEM AND METHOD FOR A MULTI-NODE ENVIRONMENT WITH SHARED STORAGE filed concurrently herewith, which is incorporated herein by reference for all purposes; and co-pending U.S. patent application Ser. No. 10/251,893 entitled A SYSTEM AND METHOD FOR EFFICIENT LOCK RECOVERY filed concurrently herewith, which is incorporated herein by reference for all purposes.

FIELD OF THE INVENTION

The present invention relates generally to computer systems. In particular, the present invention relates to computer systems that share resources such as storage.

BACKGROUND OF THE INVENTION

Servers are typically used for big applications and workloads such as those used in conjunction with large web services and manufacturing. Often, a single server does not have enough power to perform the required application. To accommodate these large applications, several servers may be used in conjunction with several shared storage devices in a storage area network (SAN). In addition, it may be valuable to group servers together to achieve better availability or manageability.

As systems become large, it becomes more difficult to coordinate multiple component updates to shared data structures with high performance and efficient behavior. It would be beneficial to synthesize atomic updates on data structures spread over multiple data blocks when the hardware can only provide atomicity at the level of single block updates. The need for atomic update arises because systems can fail, and it can be costly or impossible to find and repair inconsistencies introduced by partially complete updates. One way to manage recovery is through the use of a journal that records information about updates.

What is needed is a system and method for journal recovery in a multi-node environment that efficiently restores common data structures to a consistent state even if some of the processing nodes fail while surviving nodes have overlapping updates in progress. The present invention addresses such needs.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention are provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Figure 1:
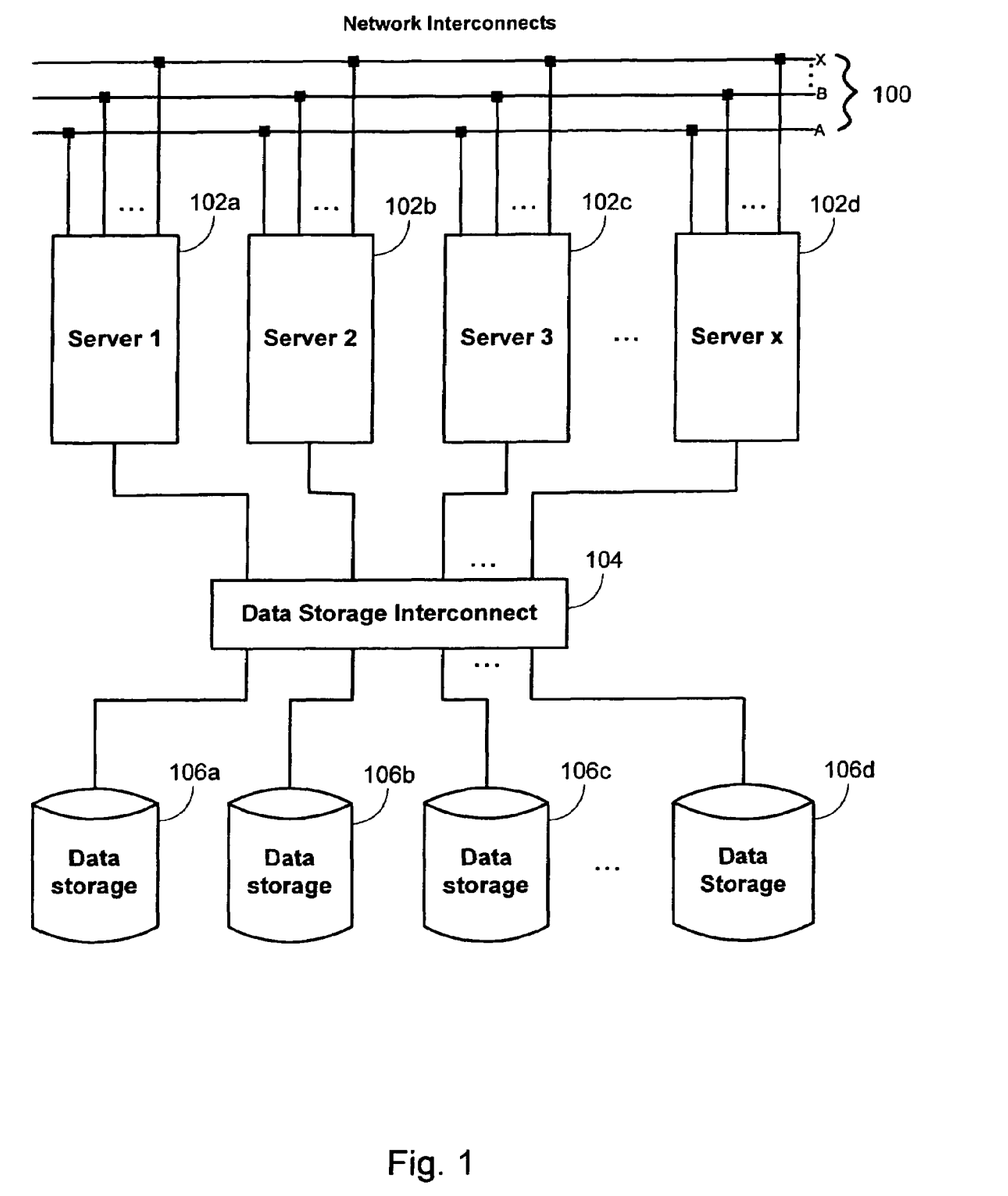
FIG. 1 is a block diagram of a shared storage system suitable for facilitating an embodiment of the present invention.

FIG. 1 is a block diagram of a shared storage system suitable for facilitating an embodiment of the present invention. In this example, nodes 102A-102D are coupled together through a network switch 100. The network switch 100 can represent any network infrastructure such as an Ethernet, InfiniBand network or Fibre Channel network capable of host-to-host communication. Additionally, the nodes 102A-102D are also shown to be coupled to a data storage interconnect 104. An example of the data storage interconnect 104 is a Fibre Channel switch, such as a Brocade 3200 Fibre Channel switch. Alternately, the data storage network might be an iSCSI or other IP storage network, InfiniBand network, or another kind of host-to-storage network. In addition, the network switch 100 and the data storage interconnect 104 may be embodied in a single interconnect. Examples of nodes 102A-102D include but are not limited to computers, servers, and any other processing units or applications that can share storage or data. For exemplary purposes, nodes 102A-102D will sometimes be referred to as servers. The data interconnect 104 is shown to be coupled to shared storage 106A-106D. Examples of shared storage 106A-106D include any form of storage such as hard drive disks, compact disks, tape, and random access memory.

Shared storage can be any storage device, such as hard drive disks, compact disks, tape, and random access memory. A filesystem is a logical entity built on the shared storage. Although the shared storage is typically considered a physical device while the filesystem is typically considered a logical structure overlaid on part of the storage, the filesystem is sometimes referred to herein as shared storage for simplicity. For example, when it is stated that shared storage fails, it can be a failure of a part of a filesystem, one or more filesystems, or the physical storage device on which the filesystem is overlaid. Accordingly, shared storage, as used herein, can mean the physical storage device, a portion of a filesystem, a filesystem, filesystems, or any combination thereof.

Figure 2A:
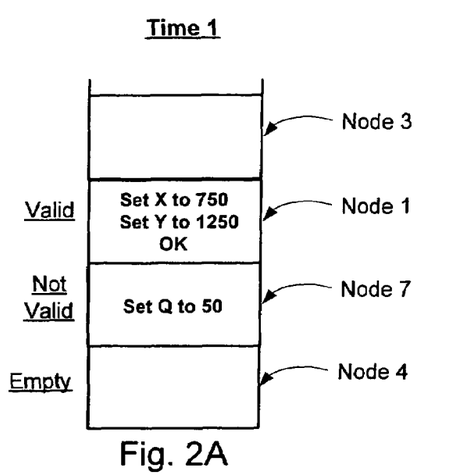
FIGS. 2A-2C are examples of journal entries according to an embodiment of the present invention.
Figure 2B:
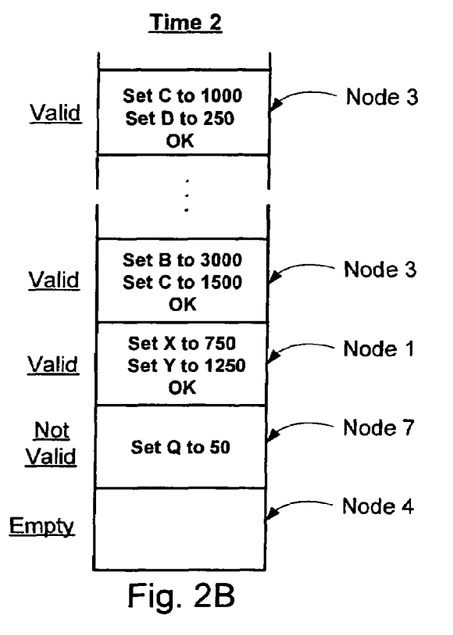
Figure 2C:
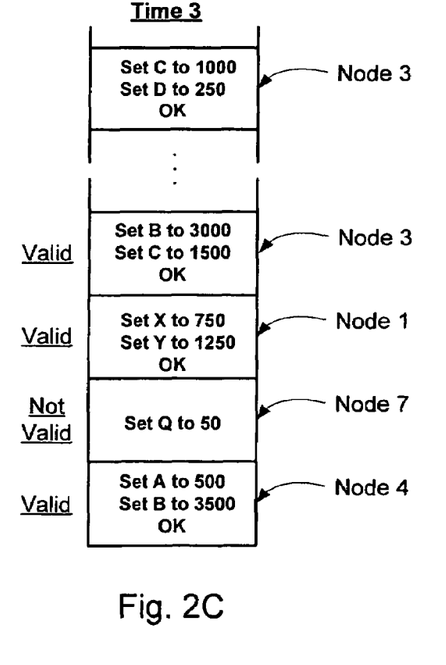

FIGS. 2A-2C are examples of journal entries according to an embodiment of the present invention. A journaling mechanism is used to allow multiple independent processing nodes to update a common set of data structures atomically, even if these updates affect multiple blocks and the hardware is not capable of updating multiple blocks atomically. A journal records information about updates, possibly affecting multiple blocks, in a way that is easily located following a system failure. The act of creating a set of such updates that preferably occurs atomically is called a transaction. Each transaction is recorded in the journal with a journal entry. A journal entry includes a set of blocks written into the journal; these blocks include copies of the block values to be written as part of the update, along with information specifying the locations where these new values will be written. Sometimes these locations will be referred to as the final locations for the update, distinguished from the copies of the block values in the journal entry itself.

By writing a single block, atomically, to complete a journal entry, the journal seals the intention to perform a multi-block update in the shared storage. This is called making the journal entry valid. Until the journal entry is valid, no block values are updated in their final locations; once the journal entry is valid, block values can be updated in their final locations as desired. Accordingly, if there is a failure before a journal entry is made valid, the system can recover a state that includes no part of the updates in the recovered transaction corresponding to that journal entry; after the write completing a journal entry has been performed and the journal entry is valid, the state that includes all parts of that transaction's update can be recovered. In other words, none of the updates, even if they have been partially written into the journal entry, will be made if the node that is making the journal entry fails before the entry is made valid. After the entry is made valid, even if there is a failure, the valid updates will ultimately completed. Thus, by examining the journal after a failure, the data structures can be restored to a state that could have existed if all multi-block updates had been made atomically.

When all new values in a particular journal entry have been written to their final locations, the journal entry can be marked expired. An expired journal entry need not be retained, since all the updates it records have been performed; the space it takes up can be re-used for another purpose.

In the example shown in FIG. 2A, at time 1, node 3 retains information in its local memory, ready to update block B to 3,000 and block C to 1,500. In this simplified example, each blocks is assumed to store just an integer, and blocks are named by letters. For example, blocks B and C may represent two separate bank accounts wherein the user has transferred money from bank account B to bank account C. Node 3 has the information but has not yet recorded it in the journal.

Node 1 has set block X to 750, set block Y to 1250 and the journal entry recording this transaction has been made valid. Node 7 has set block Q to 50. Note that node 7 is in the middle of writing the transaction and the journal entry is not yet valid. Node 4 retains information in memory and wants to update block A to 500.

Between time 1 (FIG. 2A) and time 2 (FIG. 2B), node 4 wants to update block B as part of the same transaction updating block A to 500. Block B is part of a transaction from node 3 that is not yet valid (as shown in FIG. 2A). Accordingly, node 4 asks node 3 to make that transaction valid in order for node 4 to update block B. At time 2, shown in FIG. 2B, node 3 completed writing a journal entry recording the update that sets block B to 3000 and, block C to 1500, and the transaction is now valid. And in addition, node 3 has completed writing a journal entry for a prior transaction which set block C to 1000 and block D to 250. Node 7's journal entry is still not yet valid since it has not yet finished writing out its transaction. Node 4's journal entry remains empty.

Between time 2 (FIG. 2B) and time 3 (FIG. 2C), node 4 can write a journal entry for its transaction now that node 3 has finished its transaction with regard to block B. Note that valid journal entries do not have to be contiguous according to an embodiment of the present invention. At time 3, nodes 3, 1, and 4 have written valid transactions while node 7's transaction still remains not valid.

Figure 3:
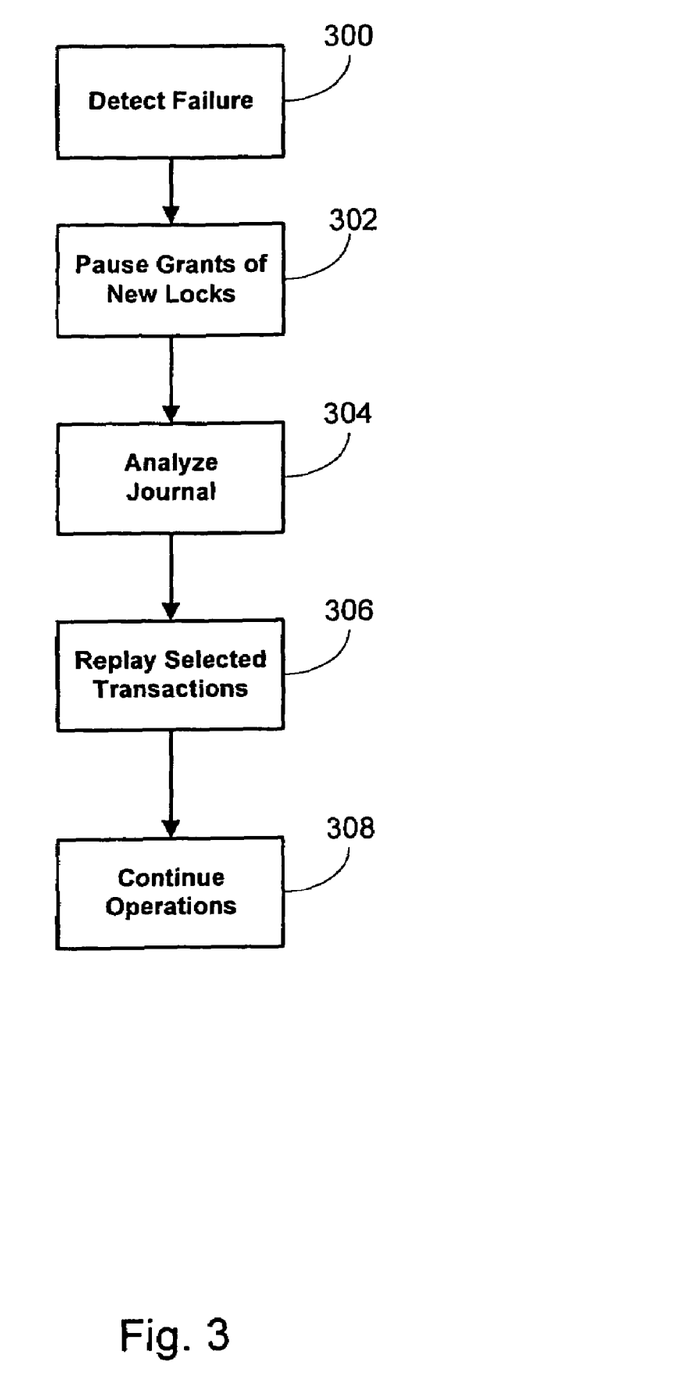
FIG. 3 is a flow diagram of a method for journal recovery according to an embodiment of the present invention.

FIG. 3 is a flow diagram of a method for journal recovery according to an embodiment of the present invention. In this example, a failure is detected (300). Examples of failures can include a server failure during a journal update. In case of failure, grants of new locks are paused (302). In a shared resource environment, such as a storage area network, locks are often used to ensure that all the nodes accessing a block of data will access the latest version. In this example, the granting of new locks are paused. The journal is analyzed (304), then selected transactions are replayed (306), then ordinary operations are continued (308).

Figure 4A:
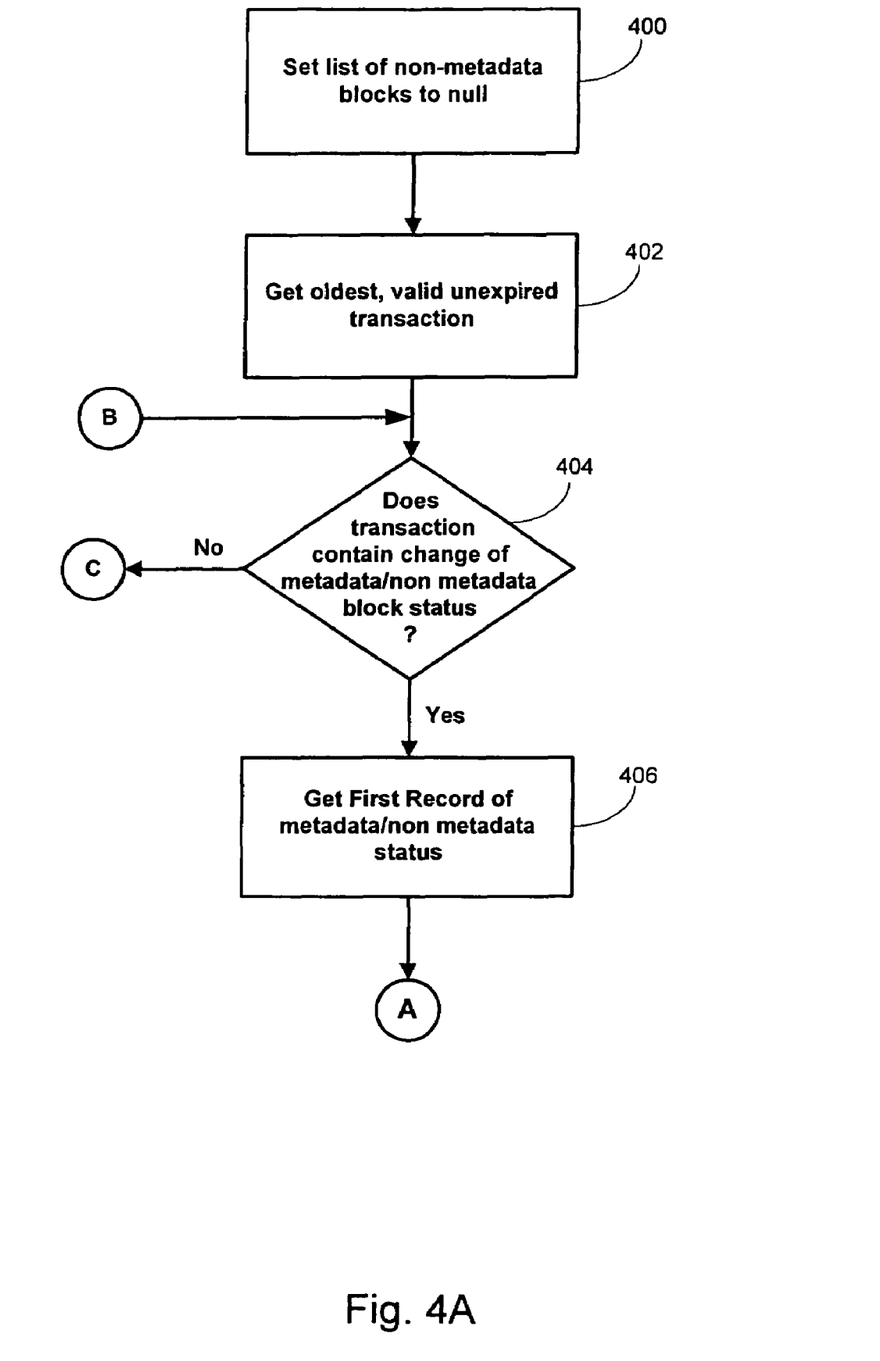
FIGS. 4A-4B are flow diagrams of a method for analyzing the journal, such as step 304 of FIG. 3, according to an embodiment of the present invention.
Figure 4B:
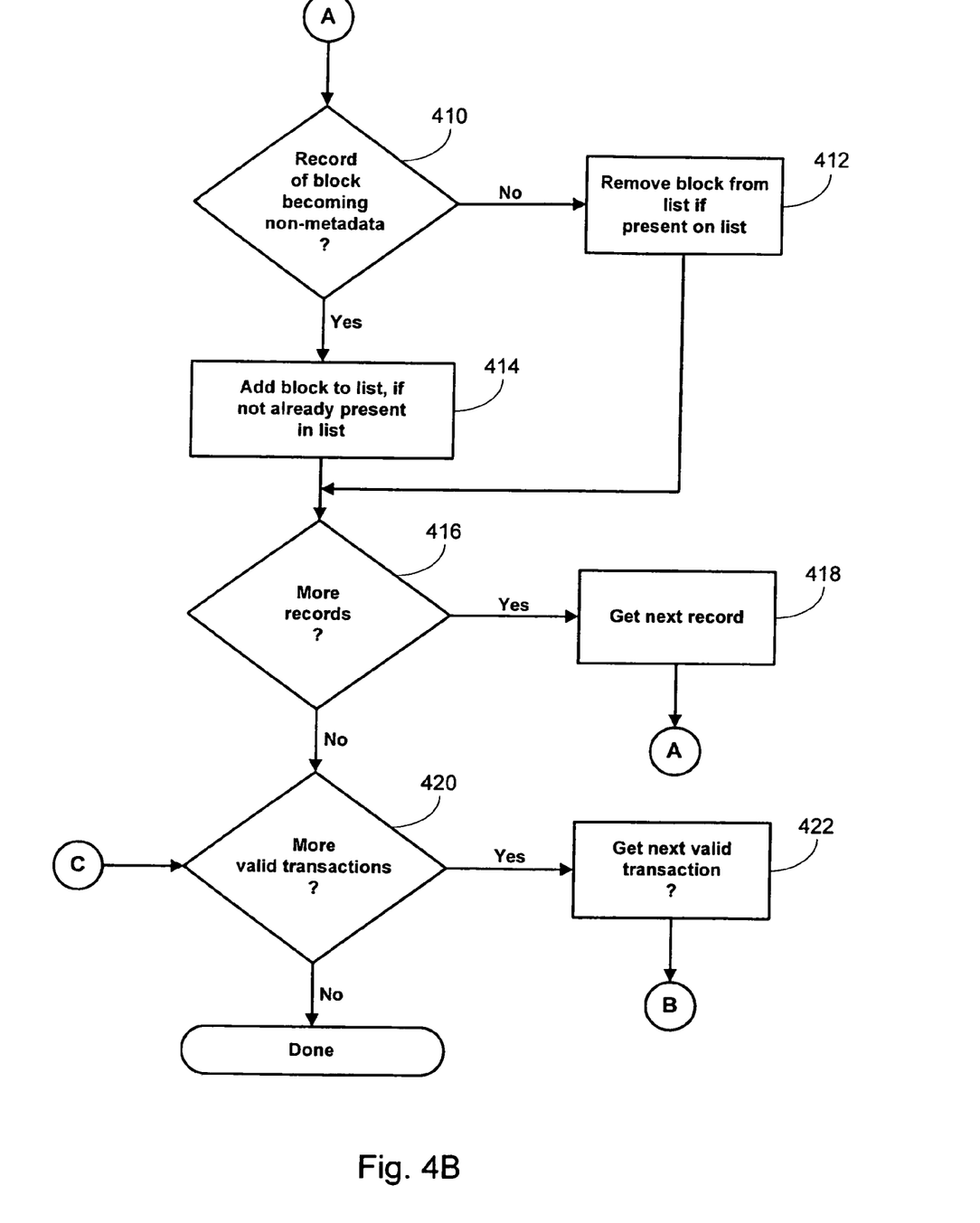
Figure 5A:
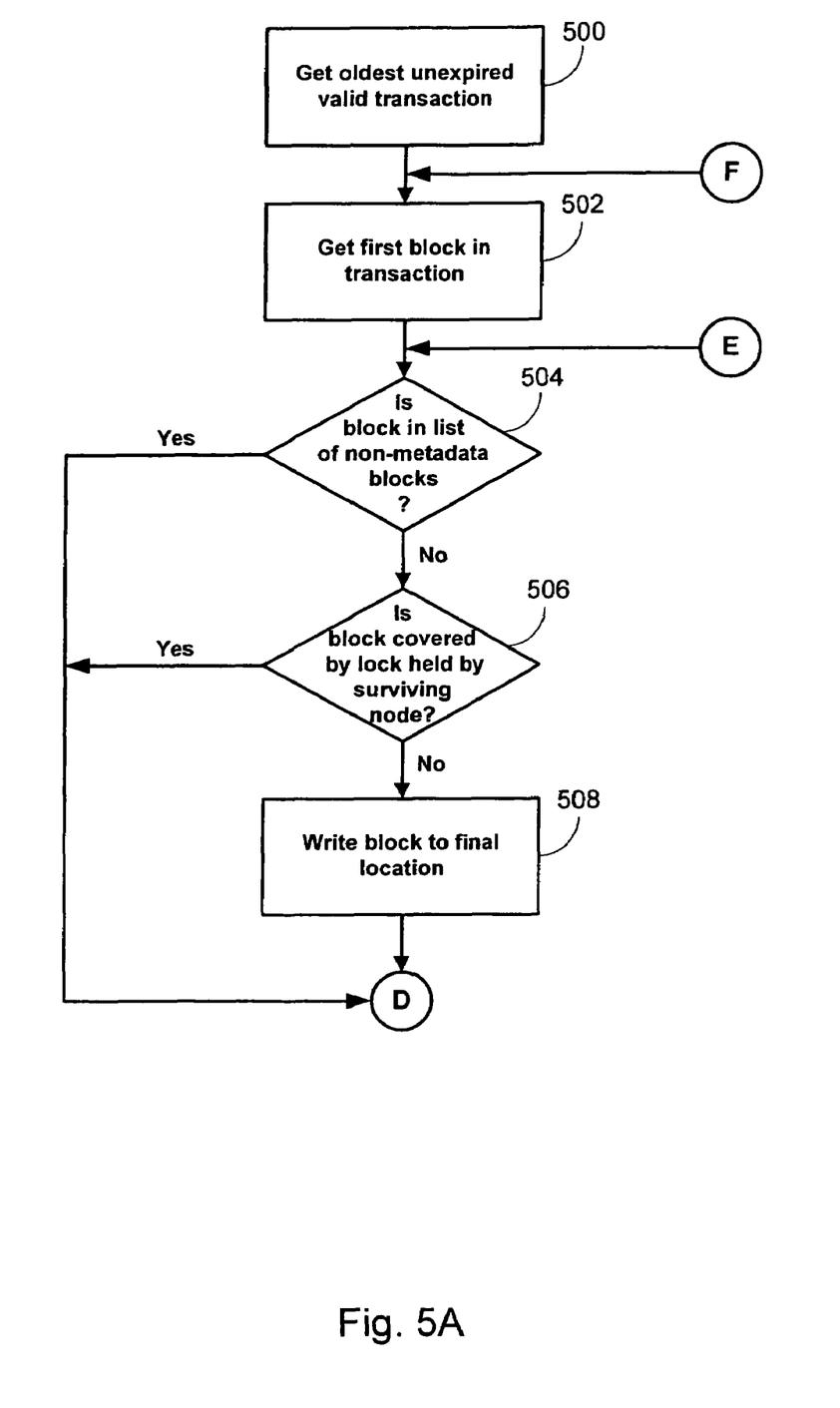
FIGS. 5A-5B are flow diagrams of a method for replaying selected transactions during journal recovery according to an embodiment of the present invention.
Figure 5B:
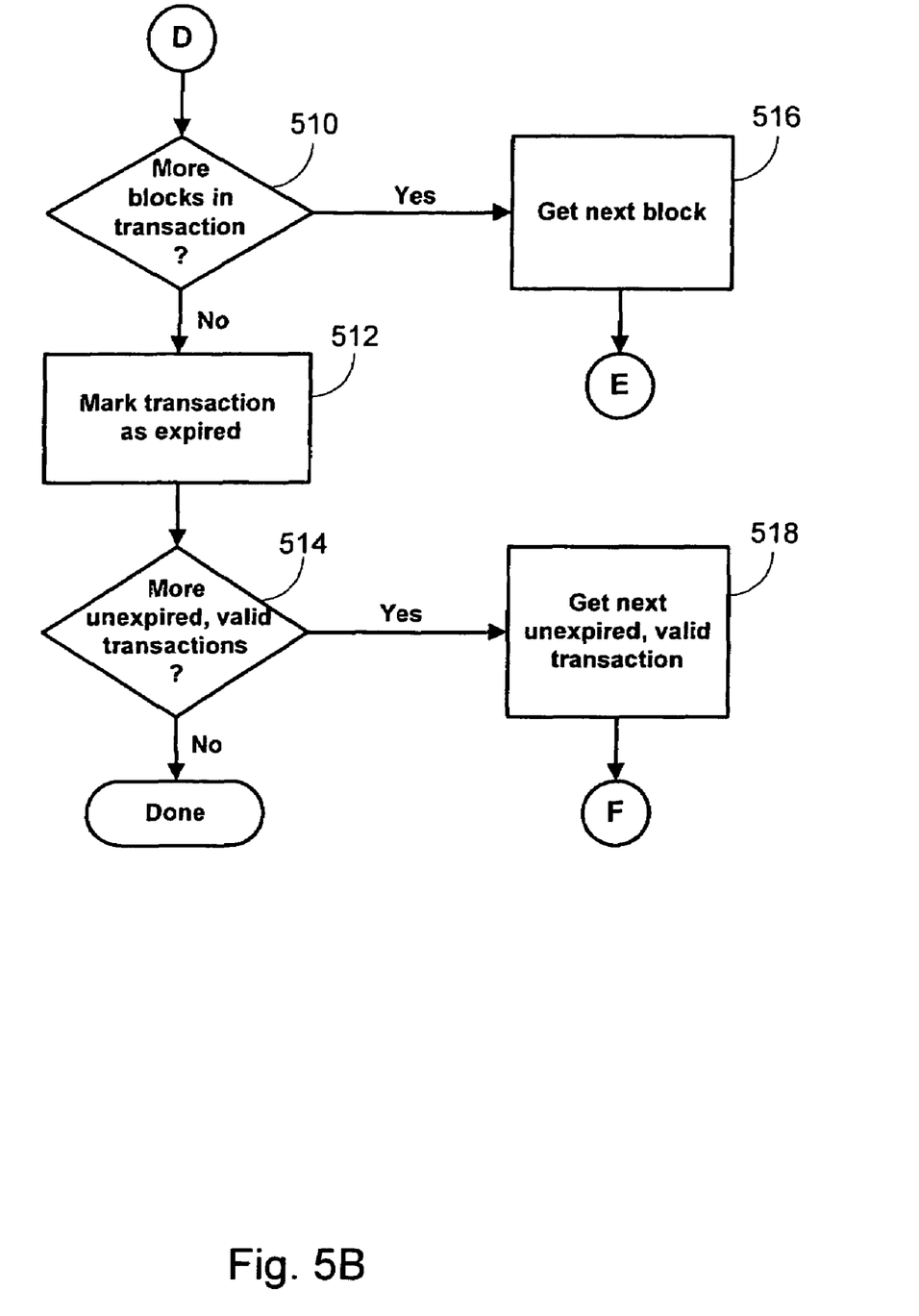

FIGS. 4A-4B are flow diagrams of a method for analyzing the journal, such as step 304 of FIG. 3, according to an embodiment of the present invention. FIGS. 5A-5B are flow diagrams of a method for replaying selected transactions during journal recovery, such as step 306 of FIG. 3, according to an embodiment of the present invention. FIGS. 4A-4B and 5A-5B are preferably read in conjunction.

In this embodiment, some data blocks are updated atomically using the journaling mechanism, and other blocks are updated directly, without using the journaling mechanism. Data blocks that are updated atomically using the journaling mechanism are herein referred to as metadata blocks. Examples of metadata blocks include but are not limited to data structure information such as file name, date a file was opened, length of file, and where contents of a file is stored.

In this embodiment, a given block may at one time belong to the set of metadata blocks, and later belong to the set of non-metadata blocks, or vice-versa; changes of blocks from one category to the other are recorded in journal entries in the journal. The journal recovery mechanism selectively updates only the appropriate blocks according to the metadata/non-metadata distinction.

In this example, a list of blocks is set to null (400). This list will record blocks which are not metadata blocks.

The oldest unexpired transaction is retrieved (402). It is determined whether the transaction contains a change of metadata/non-metadata block status (404). This determination looks to see whether the journal entry for this transaction records a block or blocks changing from belonging to the set of metadata blocks to the set of non-metadata blocks or vice-versa. This type of change is preferably recorded in the transaction and can be determined by reading the transaction. If the transaction does contain a record of changing metadata/non-metadata block status (404), then the first record of a block changing its metadata/non-metadata status is retrieved (406). There is preferably a record in the journal entry that indicates whether this particular block is or is not metadata, and it is this record that is retrieved.

It is then determined whether the record shows that this particular block has turned from metadata to non-metadata (410). If this block has become non-metadata, then the block is added to the list that was created in step 400 of FIG. 4A (414). If the block has not turned non-metadata (410), then the block is removed from the list if it is currently present on the list (412). Assuming that several changes have been made to a particular block, the block may be added to the list and removed multiple times if multiple changes have been made between changing its status from metadata to non-metadata. As each of these changes is analyzed the block will be added or subtracted from the list.

It is then determined whether there are more records (416). If so, then the next record is retrieved (418), and it is again determined if this record indicates the block becoming non-metadata (410). If there are no more records (416), then it is determined if there is another valid transaction (420). The determination of whether there is another transaction (420) is also made if the previous transaction does not contain a change of metadata/non-metadata block status (404 of FIG. 4A). If there are no other transactions, then the analysis of the journal is complete. If, however, there is another transaction, then the next transaction is retrieved (422), and it is determined whether this transaction contains a change of metadata/non-metadata block status (404 of FIG. 4A), The analysis of the journal results in a list of non-metadata blocks to ensure that the non-metadata blocks are not tampered with in the journal recovery. This method of analyzing the journal allows the set of metadata blocks to change dynamically.

FIGS. 5A-5B are flow diagrams of a method for replaying selected transactions during journal recovery according to an embodiment of the present invention. FIGS. 5A-5B show an example of step 306 of FIG. 3 and is preferably read in conjunction with FIGS. 4A-4B. In this example, a particular node retrieves the oldest unexpired valid transaction (500). The first block in the transaction is retrieved (502). It is then determined whether this block is in the list of non-metadata blocks (504). The list of non-metadata blocks was established in the analysis of the journal in step 304 of FIG. 3 and FIGS. 4A-4B.

If this block is not in the list of non-metadata blocks (504), then it is determined if this block is covered by a lock which is held by a surviving node (506). A surviving node is a node that has not failed. If the block is not covered by a lock held by a surviving node then this node writes the block to its final location (508).

It is then determined if there are more blocks in the transaction (510). If there is, consideration of this block proceeds as for the first block by first determining whether the block is in the list of metadata blocks (504).

Likewise, if this block is in the list of non-metadata blocks (504 of FIG. 5A), or if this block is covered by a lock held by a surviving node (506 of FIG. 5A), then it is determined if there are more blocks in the transaction (510). If there are more blocks, then the next block is retrieved (516), and then it is determined if this new block is in the list of non-metadata blocks (504 FIG. 5A).

If there are no more blocks in the transaction (510), then the transaction is marked as expired (512). It is then determined whether there are more valid expired transactions (514). If there are more unexpired valid transactions then the next unexpired valid transaction is retrieved (518), and the first block of the transaction is retrieved (502 FIG. 5A). If there are no more unexpired valid transactions (514), then the journal recovery is complete.

Figure 6A:
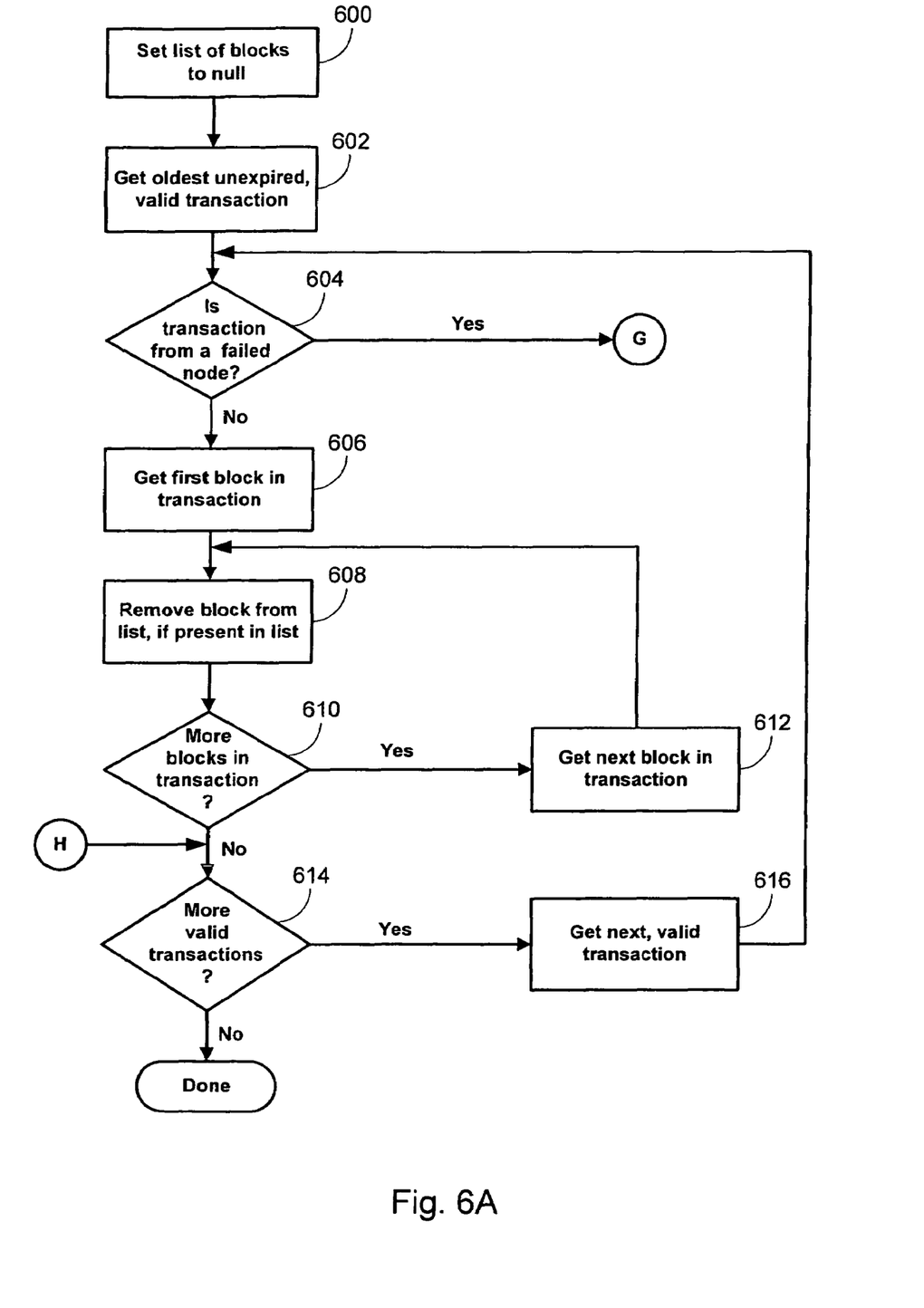
FIGS. 6A-6B are flow diagrams for a method for analyzing the journal according to an alternate embodiment of the present invention.
Figure 6B:
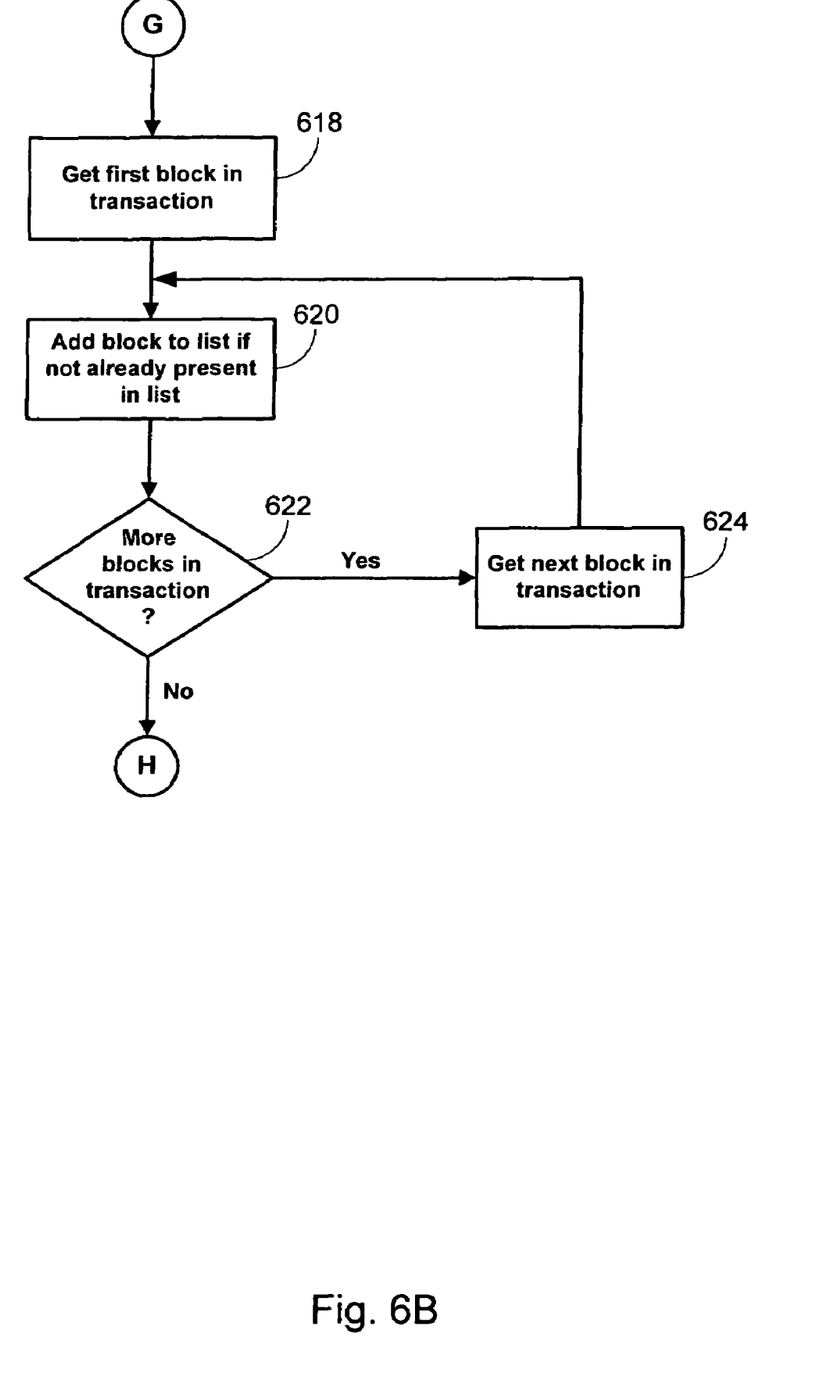

FIGS. 6A-6B are flow diagrams for a method for analyzing the journal according to an alternate embodiment of the present invention. FIGS. 6A-6B are further details of the step of analyzing the journal (304 of FIG. 3) and should be read in conjunction with FIGS. 7A-7C, which are further details of the step of replaying selected transactions (306 of FIG. 3). In this embodiment, the journal recovery is selective for a failed node's updates but does not account for blocks changing from metadata to non-metadata status or vice versa.

In this example, a list of blocks is set to null (600). When this analysis is finished, this list will consist of blocks last updated by a failed node. The oldest, unexpired valid transaction is retrieved (602). It is then determined if this transaction is from a failed node (604). If it is not from a failed node then the first block in the transaction is retrieved (606). The block is then removed from the list if it is present on the list (608). The list is the one that was established in step 600. Since a particular block may have been involved in several transactions the block may be listed on the list due to a first transaction, then later removed from the list due to a second transaction.

It is then determined whether there are more blocks in the transaction (610). If there are more blocks in the transaction, the next block in the transaction is retrieved (612). If there are no more blocks in the transaction (610), then it is determined whether there are more valid transactions in the journal (614). If there are more valid transactions, then the next valid transaction is retrieved, and it is again determined if this new transaction is from a failed node (604). If there are no more valid transactions (604), then the journal analysis is complete.

If this transaction is from a failed node (604), then the first block in 11the transaction is retrieved (618 of FIG. 6B). This block is then added to the list (620), and then it is determined if there are more blocks in the transaction (622). If there are more blocks, then the next block transaction is retrieved (624), and this new block is added to the list (620). If there are no more blocks in the transaction then it is determined if there are more valid transactions in the journal (614 of FIG. 6A).

Figure 7A:
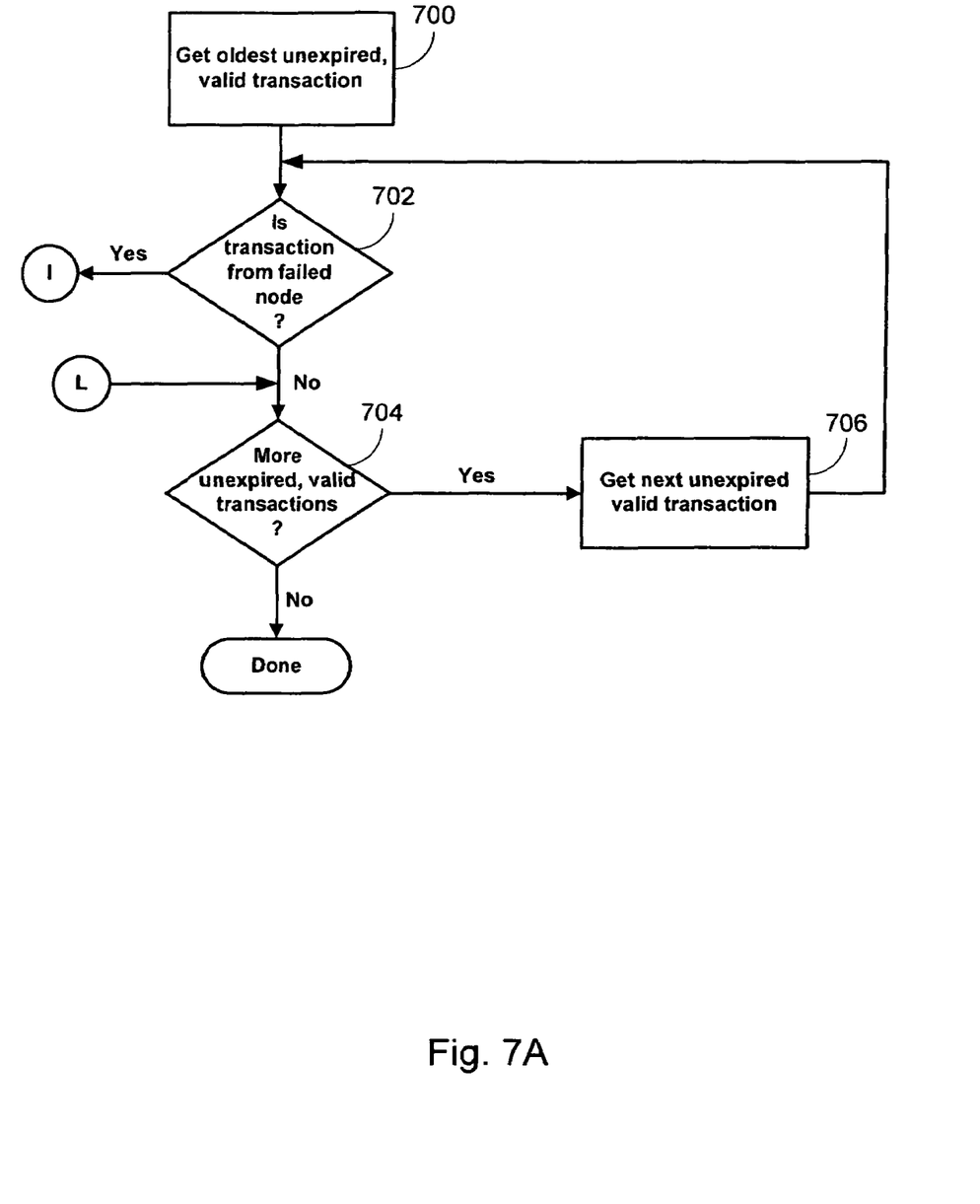
FIGS. 7A-7C are flow diagrams of a method for replaying the selected transactions for journal recovery according to the alternate embodiment of the present invention.
Figure 7B:
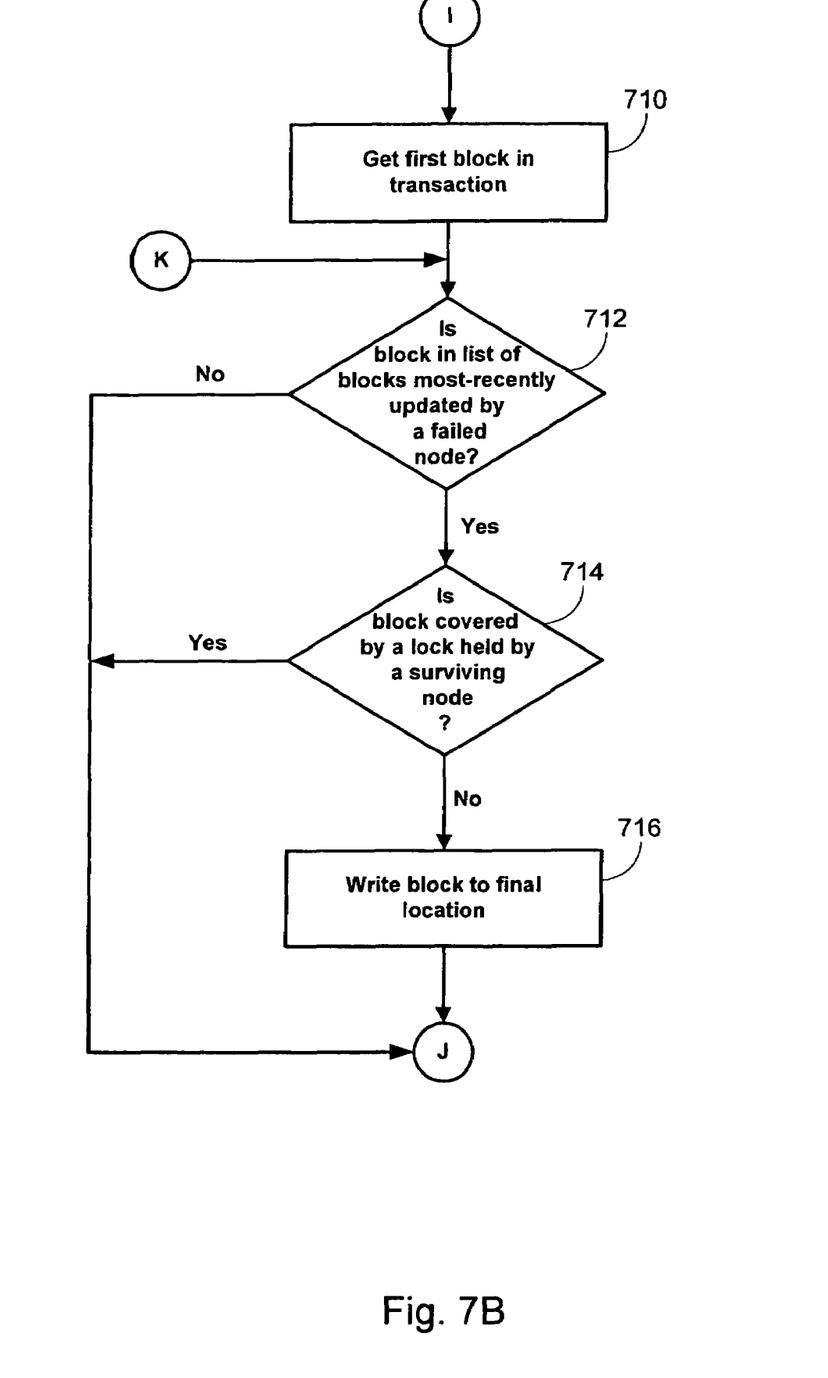
Figure 7C:
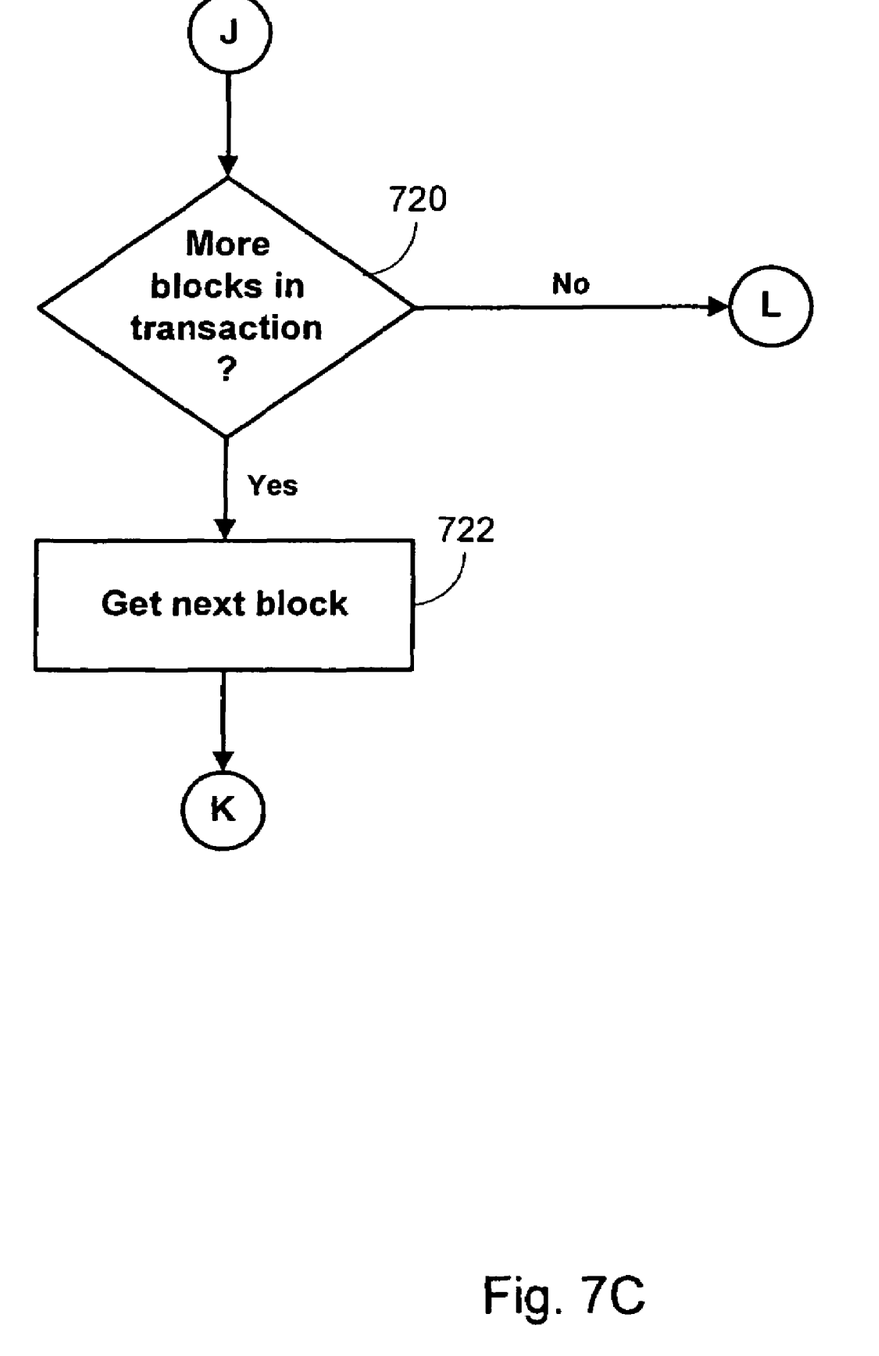

FIGS. 7A-7C are flow diagrams of a method for replaying the selected transactions for journal recovery according to the alternate embodiment of the present invention. This method is the alternate embodiment of step 306 of FIG. 3 and should be viewed in conjunction with FIGS. 6A-6B.

In this example, the oldest unexpired valid transaction is retrieved (700). It is then determined if this transaction is from a failed node (702). If it is not from a failed node, it is determined if there are more unexpired valid transactions (704). If there are more transactions, then the next unexpired valid transaction is retrieved (706). If there are no more unexpired valid transactions (704), then the journal recovery is finished.

If the transaction is from a failed node (702), then the first block in the transaction is retrieved (710). It is then determined if the block is in the list of blocks most recently updated by a failed node (712). This list is the same list that was derived in the method shown in FIGS. 6A-6B. If the block is on the list, then it is determined whether the block is covered by a lock held by a surviving node (714). A surviving node is a node that has not failed. If the block is not covered by a lock held by a surviving node, then the block is written to its final location (716). It is then determined if more blocks are in the transaction (720). This determination is also made if the block is not on the list of blocks most recently update by a failed node (712 of FIG. 7B), or the block is covered by a lock held by a surviving node (714 of FIG. 7B). If there are no more blocks in the transaction (712), then it is determined if there are more unexpired valid transactions (704 of FIG. 7A). If, however, there are more blocks in the transaction (720), then the next block is retrieved (722), and it is determined if the new block is in the list of blocks most recently updated by a failed node (712 of FIG. 7B).

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of journal recovery in a multi-node environment comprising:
    determining whether a block was updated by a first node;
    determining whether the block is associated with a lock held by a second node;
    writing the block to a final location if the block was updated by the first node and is not associated with a lock held by the second node; and
    not writing the block to the final location if the block was updated by the first node and is associated with a lock held by the second node.

2. The method of claim 1, wherein the first node is a failed node.

3. The method of claim 1, wherein the second node is a surviving node.

4. The method of claim 1, further comprising determining whether a journal entry was created by the first node.

5. A system of journal recovery in a multi-node environment comprising:
    a processor configured to determine whether a block was updated by a first node; determine whether the block is associated with a lock held by a second node; write the block to a final location if the block was updated by the first node and is not associated with a lock held by the second node; and not write the block to the final location if the block was updated by the first node and is associated with a lock held by the second node; and
    a memory coupled to the processor, wherein the memory provides the processor with instructions.

6. The system of claim 5, wherein the first node is a failed node.

7. The system of claim 5, wherein the second node is a surviving node.

8. The system of claim 5, wherein the processor is further configured to determine whether a journal entry was created by the first node.

9. A system of journal recovery in a multi-node environment comprising:
    a first node, wherein the first node has failed;
    a second node;
    a third node configured to determine whether a block was updated by the first node; determine whether the block is associated with a lock held by the second node; write the block to a final location if the block was updated by the first node and is not associated with a lock held by the second node; and not write the block to the final location if the block was updated by the first node and is associated with a lock held by the second node.

10. The system of claim 9, wherein the second node and the third node are the same node.

11. The system of claim 9, wherein the second node and the third node are different nodes.

12. The system of claim 9, wherein the second node is a surviving node.

13. A computer readable storage medium having instructions for causing a computer to execute a method, comprising:
    determining whether a block was updated by a first node;
    determining whether the block is associated with a lock held by a second node;
    writing the block to a final location if the block was updated by the first node and is not associated with a lock held by the second node; and
    not writing the block to the final location if the block was updated by the first node and is associated with a lock held by the second node.

14. The computer readable storage medium of claim 13, wherein the first node is a failed node.

15. The computer readable storage medium of claim 13, wherein the second node is a surviving node.

16. The computer readable storage medium of claim 13, further comprising determining whether a journal entry was created by the first node.

* * * * *

UNITED STATES PATENT AND TRADEMARK OFFICE
CERTIFICATE OF CORRECTION

PATENT NO. : 7,467,330 B2
APPLICATION NO. : 11/499907
DATED : December 16, 2008
INVENTOR(S) : Brent A. Kingsbury et al.

It is certified that error appears in the above-identified patent and that said Letters Patent is hereby corrected as shown below:

In column 6, line 63, after "in" delete "11".

Signed and Sealed this

Fifteenth Day of September, 2009

David J. Kappos
*Director of the United States Patent and Trademark Office*